United States Patent
Ponzio et al.

(10) Patent No.: US 9,543,813 B2
(45) Date of Patent: Jan. 10, 2017

(54) APPARATUS AND METHODS FOR WINDING SUPPORTS FOR COILS AND SINGLE POLES OF CORES OF DYNAMO ELECTRIC MACHINES

(75) Inventors: Massimo Ponzio, Tavernella Val di Pesa (IT); Gianfranco Stratico, Siena (IT); Maurizio Mugelli, Ulignano (IT)

(73) Assignee: ATOP S.p.A., Barberino Val D'Elsa, Firenze (IT)

( * ) Notice: Subject to any disclaimer, the term of this patent is extended or adjusted under 35 U.S.C. 154(b) by 1262 days.

(21) Appl. No.: 12/919,659

(22) PCT Filed: Mar. 18, 2009

(86) PCT No.: PCT/EP2009/002002
§ 371 (c)(1),
(2), (4) Date: Aug. 26, 2010

(87) PCT Pub. No.: WO2009/115312
PCT Pub. Date: Sep. 24, 2009

(65) Prior Publication Data
US 2010/0325875 A1    Dec. 30, 2010

(30) Foreign Application Priority Data
Mar. 19, 2008   (IT) ................ PI2008A0023

(51) Int. Cl.
*H02K 15/04*   (2006.01)
*H02K 15/095*  (2006.01)

(52) U.S. Cl.
CPC ........... *H02K 15/095* (2013.01); *H01F 41/064* (2016.01); *H01F 41/082* (2016.01); *Y10T 29/49009* (2015.01); *Y10T 29/53161* (2015.01)

(58) Field of Classification Search
CPC  H02K 15/045; H02K 15/0457; H02K 15/095; H01F 41/0633; H01F 41/0654; H01F 41/0612; H01F 41/0616; H01F 41/0691; H01F 41/064; H01F 41/082; H05K 15/045; H05K 15/0457; H05K 15/095; B21F 3/04; Y10T 29/49009; Y10T 29/53161
(Continued)

(56) References Cited

U.S. PATENT DOCUMENTS 3,621,190 A     11/1971  Morikawa et al.
4,150,801 A  *   4/1979  Ikegami et al. ........... 242/478.1
(Continued)

FOREIGN PATENT DOCUMENTS

EP      1 592 111        11/2005
GB      1076001 A  *   7/1967  ................ B21F 3/04
(Continued)

*Primary Examiner* — Livius R Cazan
(74) *Attorney, Agent, or Firm* — Ropes & Gray LLP

(57) ABSTRACT

Apparatus and method for winding at least one electric wire W on a coil support (10) of a core of a dynamo electric by using a wire dispensing member (19) means (21, 25) for rotating the coil support with respect to the dispensing member (19). It is foreseen to provide a relative movement of the dispensing member (19) with respect to the coil support (10) to maintain the angular orientation constant during winding. Furthermore it is foreseen to press on a portion (WP) of wire wound on the coil support (10) where the portion of wire (WP) is located immediately adjacent to a portion of wire that still has to be wound on the coil support (10). Engaging occurs also of the wire portion (WP) wound on the coils support and that extends to the dispensing member (19) when passage from one turn to another occurs for the stratification; the engagement occurring in opposition to the direction (Z') of stratification of the wire. Pressing on the wire (W) can be accomplished in a direction
(Continued)

(K) having an angle (E) that is more than zero and not perpendicular to an axis of the coil support.

30 Claims, 9 Drawing Sheets

(58) Field of Classification Search
USPC ........ 29/605, 732; 242/443, 447, 447.1, 448
See application file for complete search history.

(56) References Cited

U.S. PATENT DOCUMENTS

| | | | |
|---|---|---|---|
| 4,421,284 A | 12/1983 | Pan | |
| 5,268,551 A | 12/1993 | Kawanabe et al. | |
| 6,216,513 B1 * | 4/2001 | Nakamura | B21B 1/166 29/605 |
| 6,341,744 B1 | 1/2002 | Sugiuchi | |
| 6,400,059 B1 | 6/2002 | Hsu | |
| 6,553,650 B2 | 4/2003 | Nakamura et al. | |
| 2011/0114781 A1 | 5/2011 | Kimura et al. | |
| 2012/0124822 A1 | 5/2012 | Ponzio | |

FOREIGN PATENT DOCUMENTS

| | | |
|---|---|---|
| JP | 7-183152 | 7/1995 |
| JP | 7-194075 | 7/1995 |
| JP | 9-182390 | 7/1997 |
| JP | 11-312621 | 11/1999 |
| JP | 11-332185 | 11/1999 |
| JP | 2000-116076 | 4/2000 |
| JP | 2000-333420 | 11/2000 |
| JP | 2001-86711 | 3/2001 |
| JP | 2002-057056 | 2/2002 |
| JP | 2003-9444 | 1/2003 |
| JP | 2004-328844 | 11/2004 |
| WO | WO 2009/115312 | 9/2009 |

* cited by examiner

APPARATUS AND METHODS FOR WINDING SUPPORTS FOR COILS AND SINGLE POLES OF CORES OF DYNAMO ELECTRIC MACHINES

FIELD OF THE INVENTION

The present invention relates to winding coils of dynamo electric machines.

In particular the solutions of the invention concern winding coil supports or single poles where one or more electric conductors (in the following also referred to as wire) are wound to form a predetermined number of turns of a coil.

DESCRIPTION OF THE PRIOR ART

The supports for coils are made of insulation material and are assembled on the poles of cores after having being wound. Supports of this type have been described in JP 2003-244906.

Single poles are portions of the core and are disassembled from the core when they are wound. After winding, the single poles are assembled one adjacent to the other to form the core; see EP 1098425.

In the following the use of the terminology "coil support" contemplates both the supports for coils and single poles.

The wire that needs to be wound can have a large cross section, therefore if it undergoes bending this will remain as a permanent deformation if it is not recovered with further bending of the wire.

During winding the wire is deformed to be in contact with the surface of the coil support, or to be in contact with portions of wires which have already been wound on the coil support.

The deformation process bends the wire according to a configuration that tries to closely match the shape of the perimeter of the coil support where the wire turns are wound. This is done to optimize the amount of wire that can be wound in a given space of the coil support.

Winding can occur by rotating the coil support to draw the wire from the exit of a dispensing member and by directing the wire from the dispensing member to predetermined locations of the coil support.

Alternatively, winding can occur by displacing the dispensing member to draw and direct the wire. JP 2003-244906 describes a mechanism consisting of a winding arm which rotates to draw and locate the wire on the coil support. The solution of this document provides a pressure member, which presses on the wire that has been wound to maintain it in contact with the coil support during rotation.

Modern applications of dynamo electric machine cores require that the quantity of wire that fills an allocated space of the coil support should be very high. Furthermore, to achieve this maximum result the integrity of the wire that is being wound needs to be guaranteed. In particular, damage to the insulation of the wire needs to be avoided and the wire should not be subject to high local deformations. The damage, if present, can be a source for early failure of the dynamo electric machine.

SUMMARY OF THE INVENTION

Accordingly, it is an object of the present invention to position the wire accurately in predetermined locations of the coil support during winding to form a coil.

It is a further object of the present invention to guarantee that the wire wound on the coil support is accurately deformed to be positioned along predetermined trajectories of the coil support, thereby increasing the filling.

It is also an object of the present invention to apply an accurate and predetermined deformation along the wire during winding to guarantee maximum filling and the integrity of the wire.

These and other objects are achieved with the apparatus according to apparatus claim 1 and the method according to claim 14 of the present invention.

Other characteristics of the inventions are presented in the dependent claims.

According to an embodiment of the invention the apparatus comprises:
  means for rotating the coil support relative to the dispensing member to wind the wire on the coil support, and
  means for pressing on a portion of the wire that has been wound on the coil support, wherein during winding the pressing means remains in contact with a wire portion located on the coil support immediately adjacent to portions of the wire that still have to be wound on the coil support.

In an embodiment of the invention the method comprises the steps of:
  rotating the coil support with respect to the dispensing member to wind the wire on the coil support;
  using pressing means for pressing on a portion of wire wound on the coil support, wherein during winding the pressing means remains in contact with a wire portion that is immediately adjacent to portions of the wire that still have to be wound on the coil support.

According to another embodiment the apparatus for winding the coil support comprises:
  a dispensing member having a portion for passage of the wire and an exit from where the wire reaches the coil support during winding;
  means for rotating the coil support with respect to the dispensing member to wind the wire on the coil support; the wire extending from the dispensing member to the coil support having an angular orientation with respect to the exit of the dispenser; and
  means for the relative movement of the dispensing member with respect to the coil support to maintain the angular orientation constant during winding.

According to this other embodiment, the method for winding the coil support provides the steps of:
  rotating the coil support with respect to the dispensing member to wind the wire onto the coil support; the wire extending from the dispensing member to the coil support having an angular orientation with respect to the exit of the dispensing member; and
  relatively moving the dispensing member with respect to the coil support to maintain the angular orientation constant during winding.

In a further embodiment the apparatus for winding the coil support comprises:
  a dispensing member having a portion for passage of the wire and an exit from where the wire reaches the coil support during winding;
  means for rotating the coil support with respect to the dispensing member to wind the wire on the coil support;
  means for displacing the dispensing member with respect to the coil support for stratifying the wire of the coil, and
  means for engaging the portion of wire wound on the coil support that extends up to the dispensing member; the engagement occurring opposite to the direction of wire stratification for the wires of a layer of a coil.

In a further embodiment the method provides:

rotating the coil support with respect to the dispensing member to wind the wire on the coil support;

displacing the dispensing member with respect to the coil support for stratifying the wire of the coil;

engaging the portion of wire wound on the coil support that extends to the dispensing member, wherein the engagement occurs opposite to the direction of wire stratification for the wires of a layer of a coil.

BRIEF DESCRIPTION OF THE DRAWINGS

Further characteristics and advantages of the method and apparatus according to the invention will be more apparent from the following detailed description and the accompanying drawings of the preferred embodiments, which is made to be exemplary without being limitative. In the drawings:

FIG. 1 is a view from direction 1 of FIG. 2A.

DETAILED DESCRIPTION OF THE PREFERRED EMBODIMENTS

Figure 1:
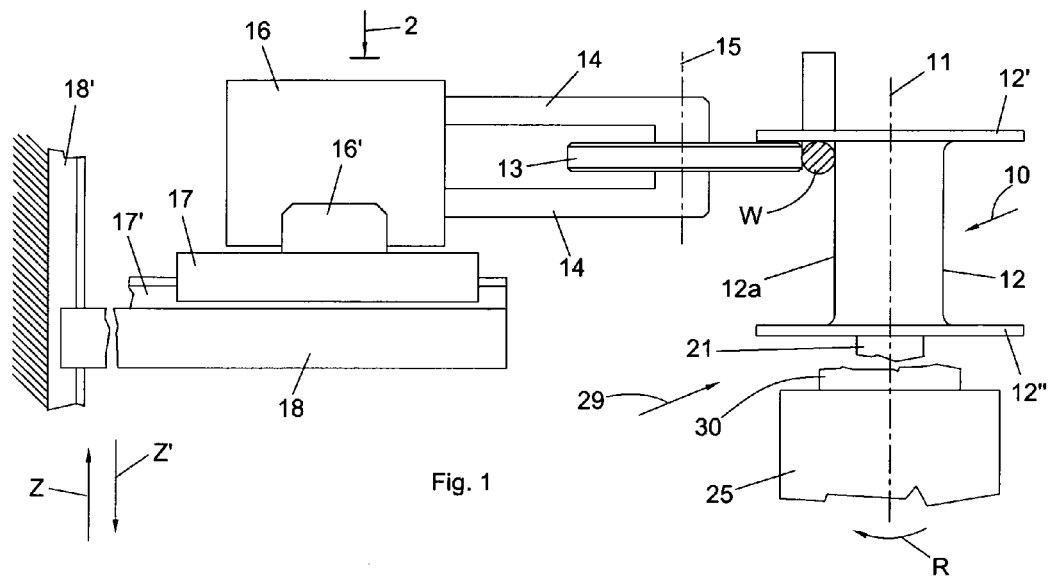
FIG. 1 is a partial elevational view illustrating the solution of the invention according to a first embodiment in a condition of winding like that shown in FIG. 2A.

With reference to FIGS. 1 and 2 the apparatus of the invention is provided with an assembly 29 for holding and rotating a coil support 10. The assembly comprises a holding member 21, which becomes inserted in hollow portion 10' of coil support 10.

Figure 3:
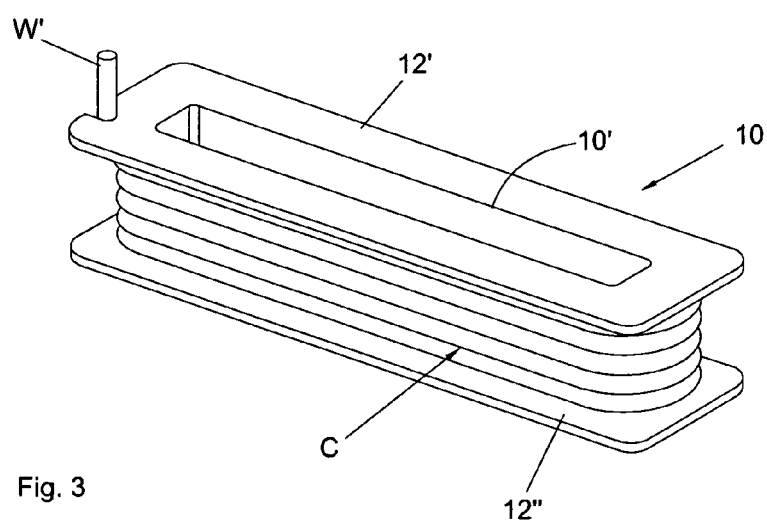
FIG. 3 is a perspective view from direction 3 of FIG. 2A illustrating a coil support that has been wound with a predetermined number of turns by using the solution of the invention.

Coil support 10 comprises a central portion 12 and opposite flanges 12' and 12". Wire W is wound around portion 12 up to flanges 12' and 12" to form a coil C of a certain number of turns, as shown in FIG. 3.

In FIGS. 2A-2E superior flange 12' has been made transparent to show parts that would otherwise be hidden in the views from direction 2.

Figure 2A:
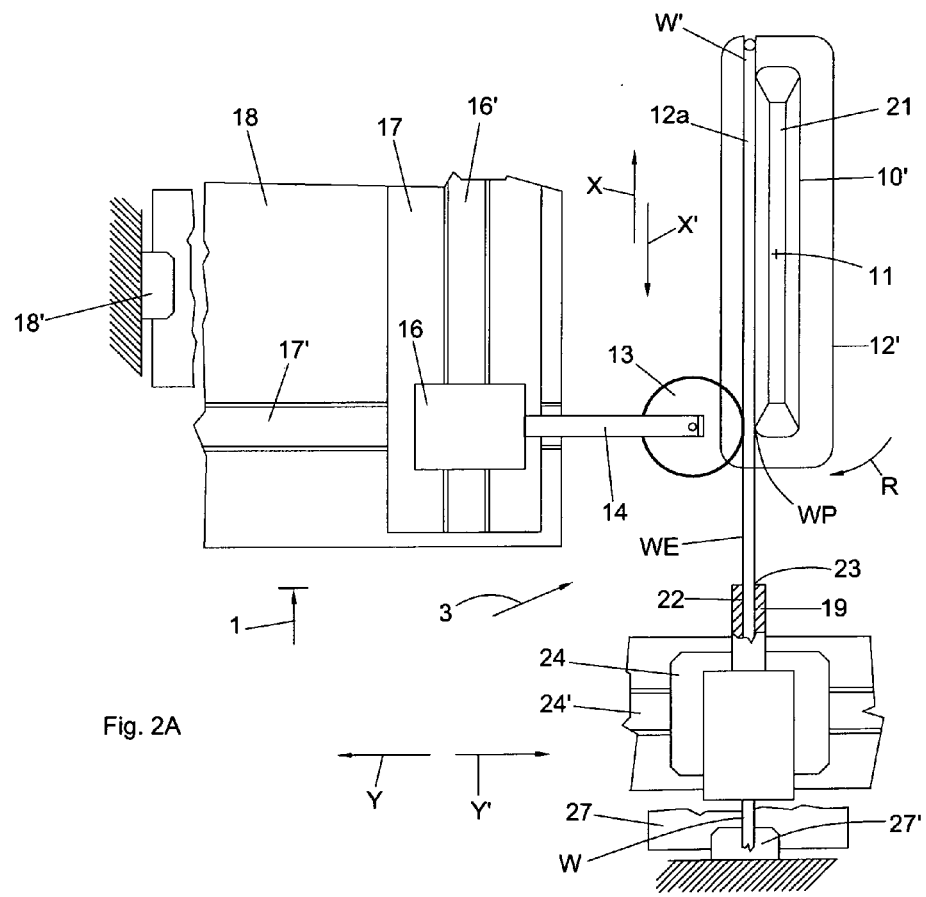
FIGS. 2A-2E are views from direction 2 of FIG. 1 and illustrate a sequence of winding conditions obtained with the solution of the invention to wind a turn of wire on a coil support.

With reference to FIG. 2A, member 21 applies a grip on the internal surface of hollow portion 10' to hold coil support 10 in alignment with rotation axis 11. Axis 11 can be aligned with an axis of symmetry of the coil support, as shown in FIGS. 1, 2A-2E. During winding, coil support 10 rotates with rotation R around axis 11 by rotating holding member 21 with drive unit 25.

As shown in FIGS. 2A-2F, wire W is delivered by dispensing member 19, which receives wire W from a wire supply (not shown).

During winding, wire W runs though passage 22 of dispensing member 19 and leaves dispensing member 19 through exit 23 to reach coil support 10. Dispensing member 19 is assembled on platform 24 so that exit 23 faces coil support 12. Exit 23 is provided with a solid contour for guiding the wire.

Platform 24 can be displaced in direction Y and Y' by sliding on guide 24'. Movement of platform 24 in directions Y and Y' changes the distance between dispensing member 19 and axis 11, which represents the reference for rotation of the coil support.

The embodiment of FIG. 1 provides a pressure wheel 13 that is supported by arms 14 (see also FIG. 2A). The pressure wheel can be idle in its rotation around axis 15 of arms 14. Arms 14 are carried by platform 16, which can move in directions X and X' by sliding on guide 16'. Guides 16' can be carried by platform 17, which can move in direction Y and Y' by sliding on guides 17'. Guides 17' can be part of a further platform 18 which moves when required in directions Z and Z' by sliding on guides 18' of the apparatus frame.

Accordingly, pressure wheel 13 is capable of moving in directions X, X', Y, Y', Z, Z' with respect to a stationary origin, like a point of rotation axis 11.

To start winding a turn of wire on portion 12 of the coil support (see FIG. 2A), the initial portion W' of wire W is anchored by a wire manipulator in a recess of the coil support 10 (as shown in the figures), or the initial portion W' is anchored in a clamping device that rotates with holding member 21 (not shown in the figures). In this way, initial portion W' remains stationary with respect to the coil support 10 and therefore wire W is drawn from dispensing member 19 by means of rotation R of the coil support around axis 11.

As shown in FIG. 2A, exit 23 of dispensing member 19 is aligned with side 12a of the coil support. The alignment is such that wire extension WE from exit 23 to side 12A of the coil support is oriented without bending the wire coming out from exit 23. Therefore, the extension of wire WE is not inclined with respect to exit 23, in order to avoid bending the wire where the contact occurs with the contour of exit 23.

As shown in FIG. 2A, pressure wheel 13 can press on a wire portion WP that is immediately adjacent to a portion of the wire that still has to be wound on the coil support. In this way, the wire is deformed against the coil support practically from when the wire starts contact with the coil support.

Figure 2B:
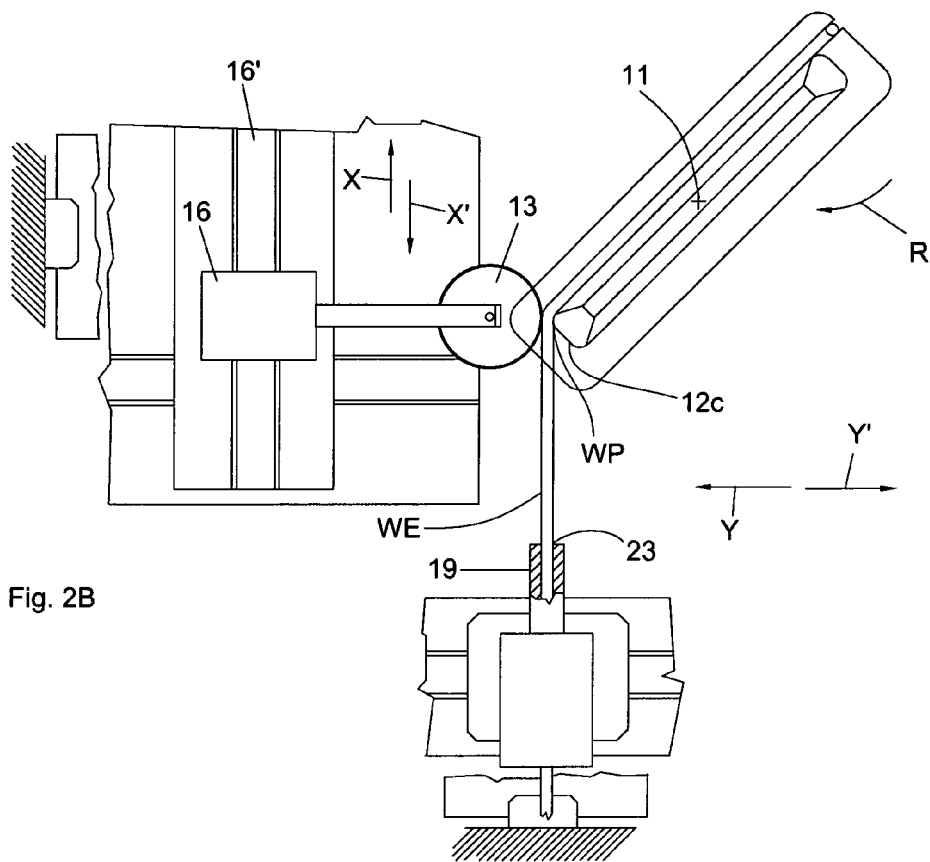
Figure 2C:
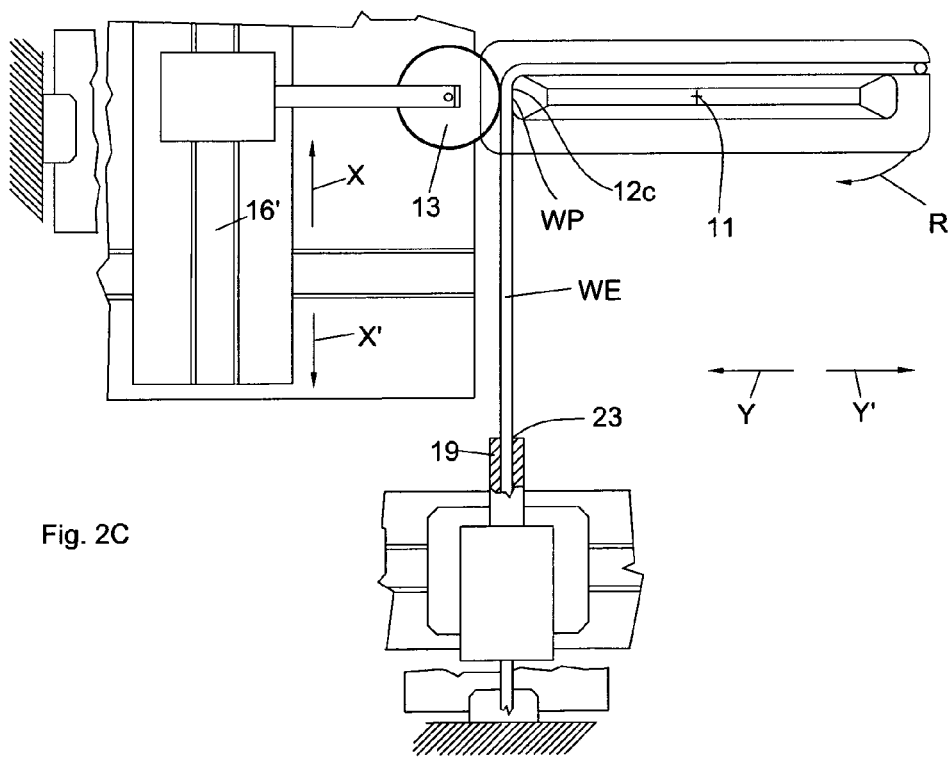

FIGS. 2B and 2C show that coil support 12 has been rotated to draw further wire W on side 12a and on transverse side 12c of the coil support. During the rotation R, wheel 13 moves in directions X and Y to keep the deformation pressure on wire portion WP, which is located immediately adjacent to the portion of wire that still has to be wound on the coil support. In this way the wire continues to be deformed against the coils practically from when the wire starts to contact the coil support. In other words the point WP is like a point of tangency of wire WE with the shape of the coil that progressively becomes wound on the coils support.

At the same time, dispensing member 19 has moved more and more in direction Y during the rotation of the coil support to maintain constant the orientation of wire extension WE and therefore to avoid bending the wire at exit 23. In other words the angle of extension WE is maintained constant with respect to exit 23.

Figure 2D:
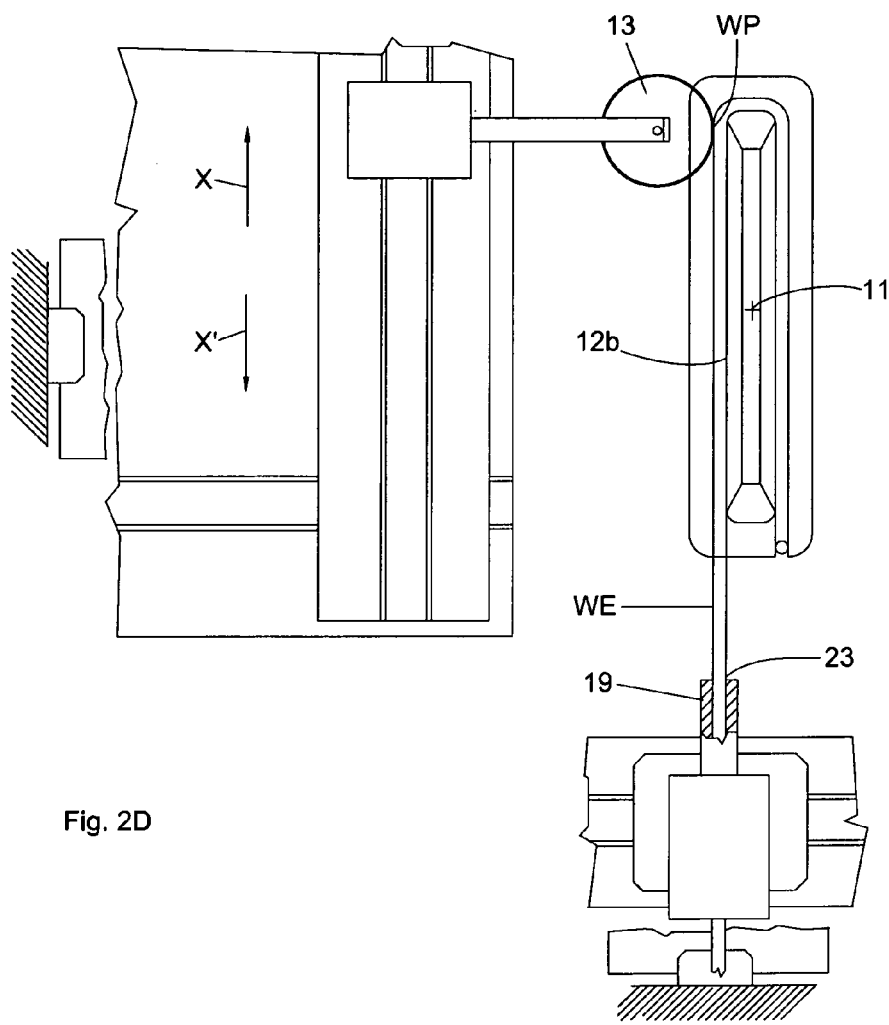

FIG. 2D shows the condition in which the coil support has rotated for a complete turn and pressure wheel has moved in direction X and direction Y'.

Furthermore dispensing member 19 has moved in direction Y' to maintain constant the orientation of extension WE. In FIG. 2D the pressure wheel starts a translation in direction X' to reach the position shown in FIG. 2E. During the translation, pressure wheel 13 can continue to press on the portion of wire that has been directed along side 12b. The speed for translating pressure wheel 13 along side 12b can be higher than the speed normally used to translate the pressure wheel in the other translations of FIGS. 2A-2C. This occurs to avoid that the pressure wheel loses time for reaching the appointment for continuing rotation R of the coil support, as it is required in the situation of FIG. 2E.

Figure 2E:
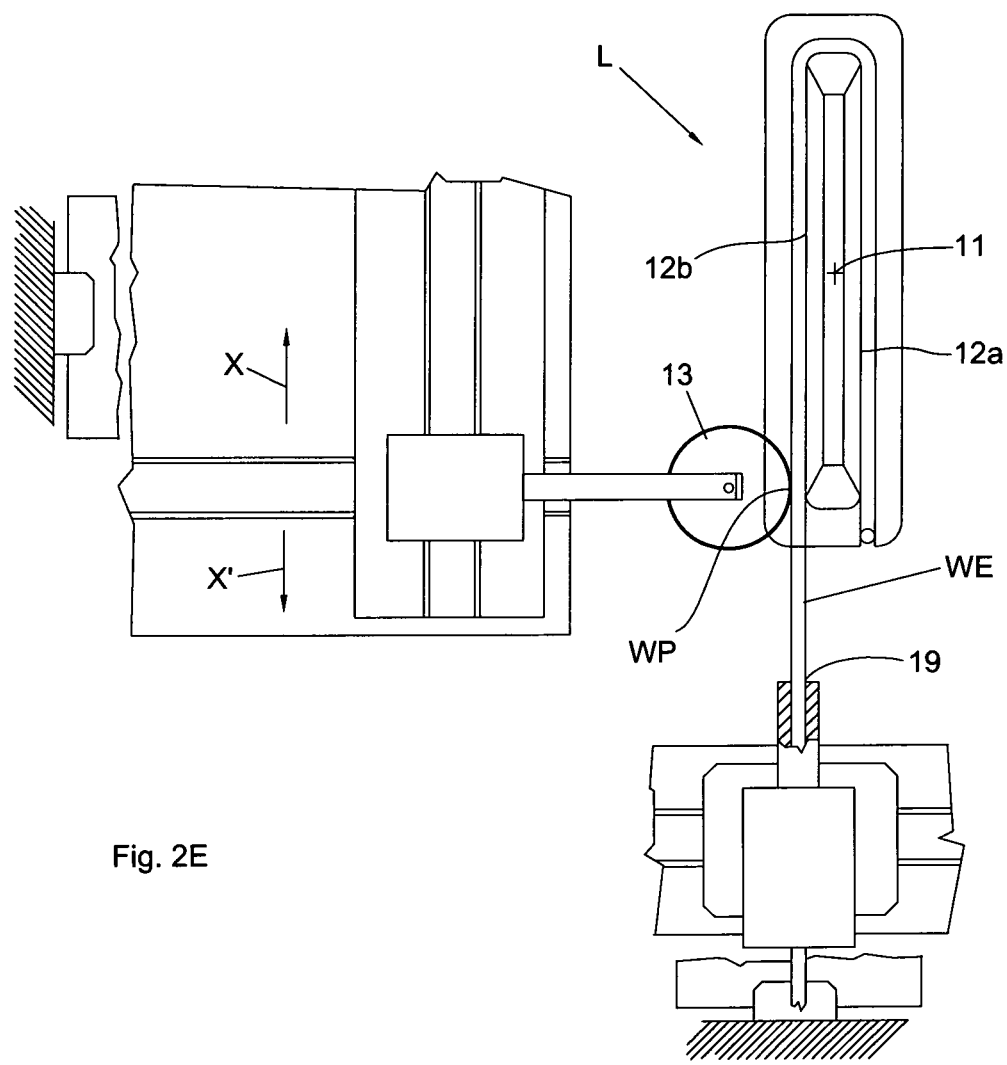
Figure 2F:
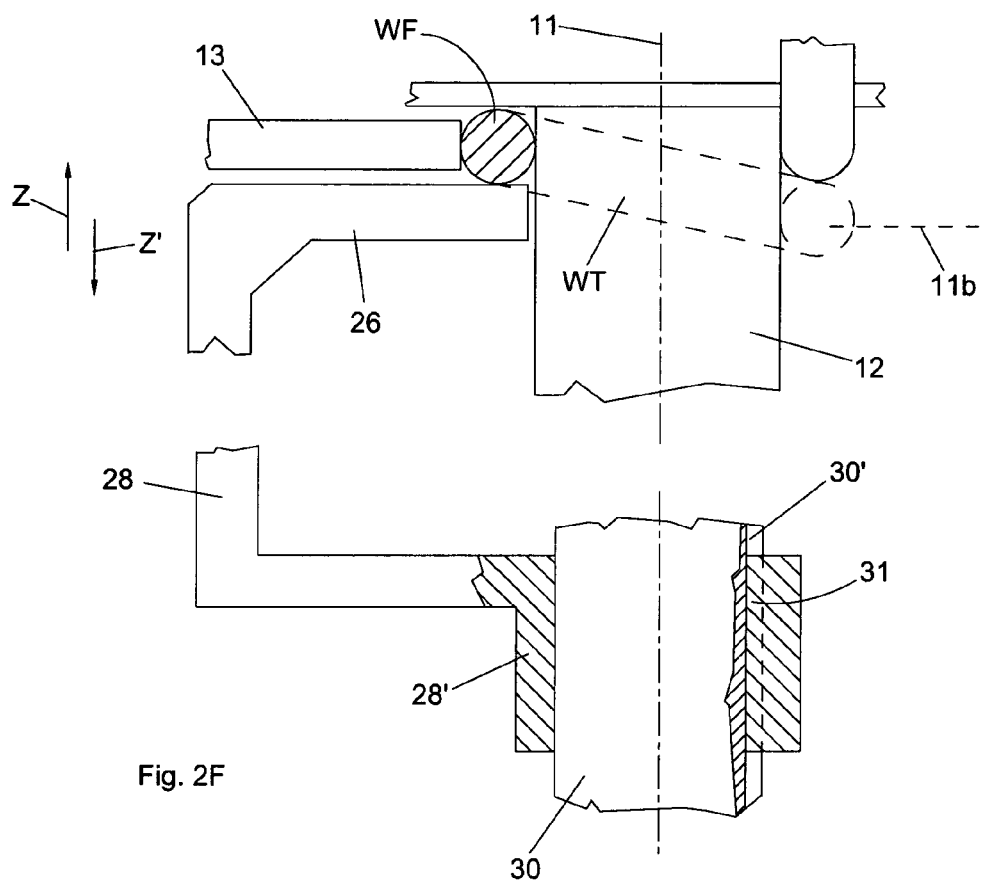
FIG. 2F is a view similar to the view of FIG. 1 and illustrates a condition of winding which occurs after the condition of FIG. 2E.

After the situation of FIG. 2E, dispensing member 19 can be translated in direction Z' (see FIG. 2F) by using platform 27 moving on guides 27' for directing the successive turn of wire with a transition stretch WT in a second winding plane 11b, which is perpendicular to axis 11 (see dashed line representation of wire WT in FIG. 2F). The pressure wheel can be moved in direction Z' in such a way that it is synchronized with the translation of dispensing member in direction Z', in order to guarantee that the pressure wheel remains in contact and presses on wire WT that winds around the transverse portion 12d. FIG. 2F shows an engagement member 26 positioned for engaging the last stretch of wire WF of the first winding plane. The engagement is required if the last stretch of wire WF tries to exit from the first winding plane. The exit of the wire WF from the first winding plane can occur, for example, when pressure wheel 13 and dispensing member 19 are moved in direction Z' to form stretch WT.

Engagement member 26 is adapted to rotate integral with coil support 10, and when required it translates in directions Z and Z' to support the various wires that need to be deposited along portion 12 in directions Z and Z', like it has been described above. Therefore, support member 26 supports the various wire by acting as a barrier against their movement in the direction of stratification (direction Z' in the case of FIG. 2F).

The devices for accomplishing the motions of member 26 comprise a support arm 28. The arm 28 is provided with a hub portion 28' assembled coaxially to the rotation shaft 30 of holding member 21. Key 30' present on shaft 30 is engaged by a key portion 31 of the hub for transmitting to arm 28 the rotation R of shaft 29.

Shaft 30 is moved by drive unit 25. A drive member (not shown) can translate the hub portion along shaft 30 in directions Z and Z' to translate support member 26 in directions Z and Z', as it is required to position member 26 to function as a barrier against movement of the single wires that need to be deposited along portion 12 within a layer of the coil. The definition "layer of the coil" has the meaning of turns wounds after one another to become positioned practically at the same distance from axis 11.

Figure 4:
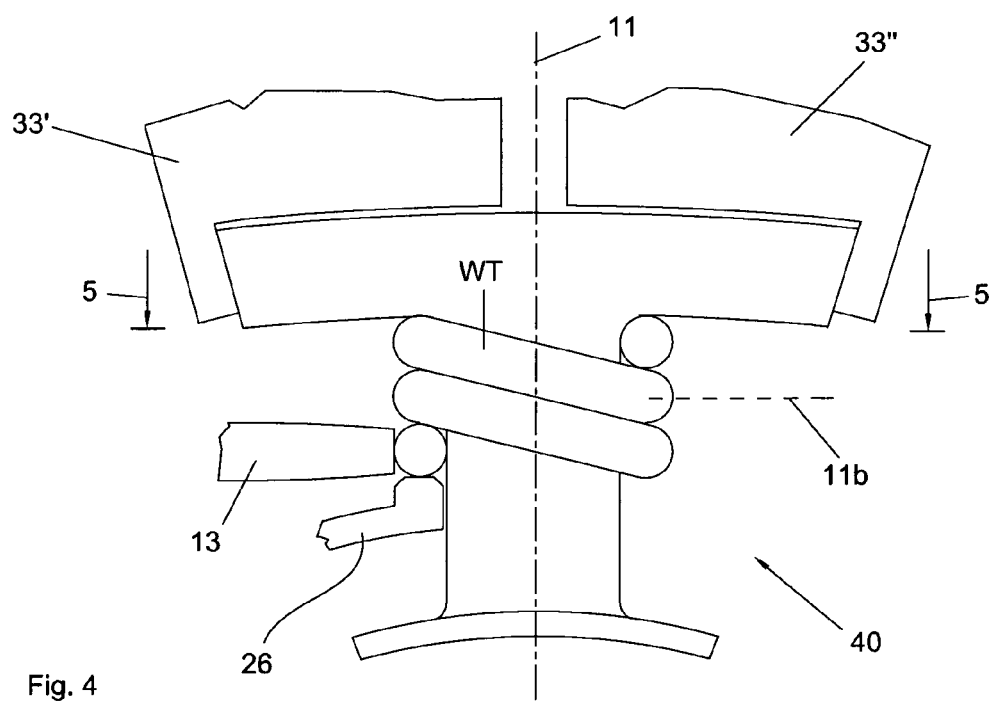
FIG. 4 is a view similar to the view of FIG. 2F and shows winding a single pole according to a solution of the invention.
Figure 5:
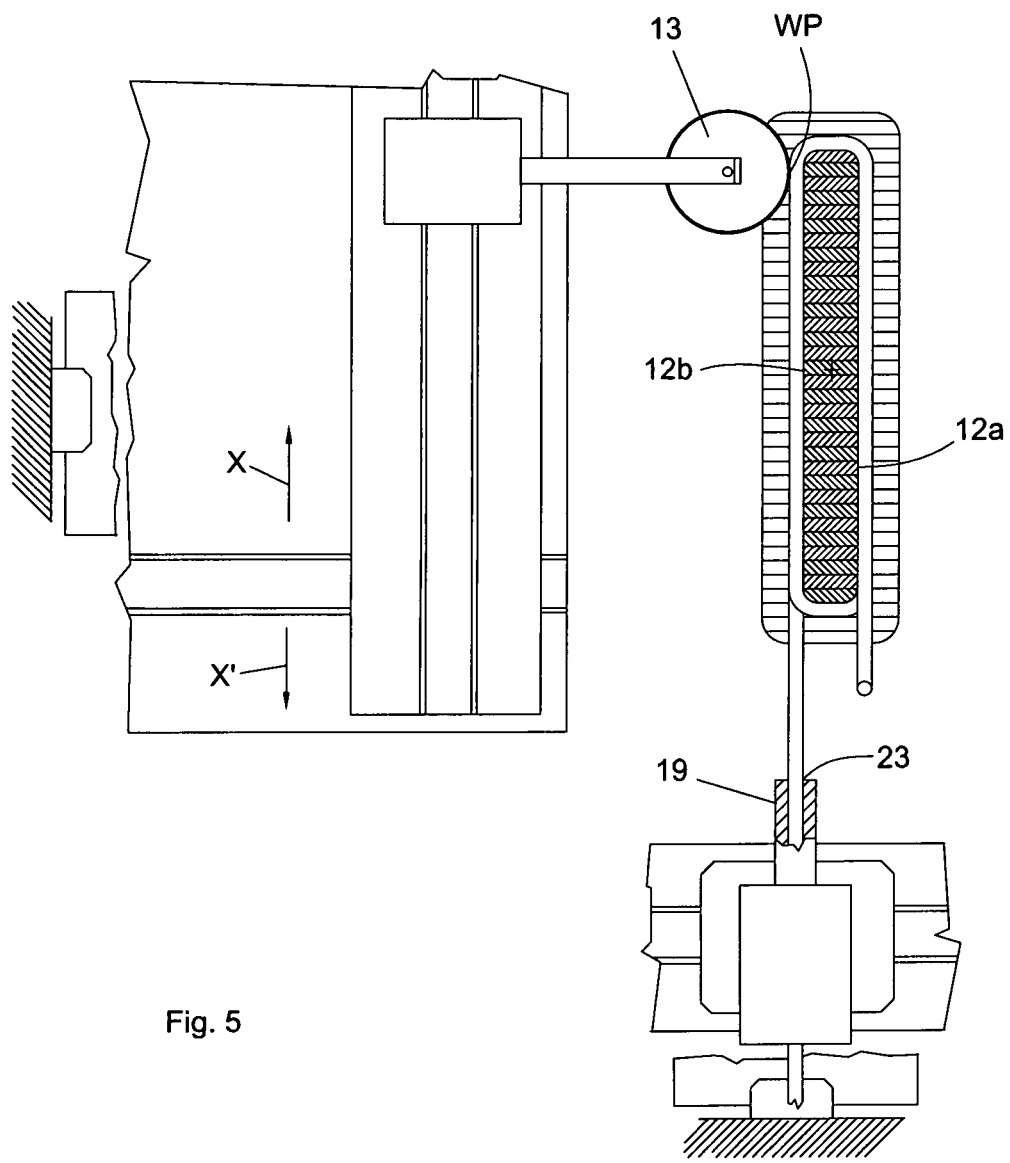
FIG. 5 is a partial sectional view from directions 5-5 of FIG. 4.

FIGS. 4 and 5 show a single pole 40 that is wound in a manner that is similar to the description of FIGS. 1-3. The single pole can be held with chucks 33' and 33" which can rotate around axis 11. The single pole has sides like 12a, 12b, 12c, 12d described above for the coil support 10.

The relative movements of the pressure wheel 13, of the dispensing member 19 and of the engagement member 26 with respect to a single pole can occur like it has been described above for winding coil C as shown in FIG. 3.

In general for the various embodiments, the pressure exerted by wheel 13 on the wire can be adjusted in a predetermined manner using the control of the movements of platform 17, which is needed for translation in directions Y and Y'. Control of the pressure applied by wheel 13, if synchronized with the motion law of rotation R of the coil support, allows a predetermined and accurate pressure to be applied along the wire which is wound around the coil support.

Furthermore, the synchronization of the pressure wheel movements in directions X,X',Y,Y',Z,Z' with the law of motion of rotation R allows deformations of the wire against the coil support practically from when the wire starts contact with the coil support; see portion WP. In other words it is possible to accomplish with constancy the condition that point WP is the point of tangency of wire WE with the profile of the coil support, or the point of tangency with shape of the coil which progressively winds onto the coil support.

Also the movement of dispensing member 19 using platforms 24 and 27 can be synchronized with the law of motion of rotation R of the coil support to guarantee that the orientation of extension WE, or in other terms that the angle of extension WE, remains constant with respect to exit 23.

A sequence of conditions like those of FIG. 2A-2F can be repeated both for coil support 10 and for single pole 40, in order to form successive turns of wire in further planes. This accomplishes stratification of the wire along portion 12, as shown in FIG. 3 for coil support 10.

Figure 6:
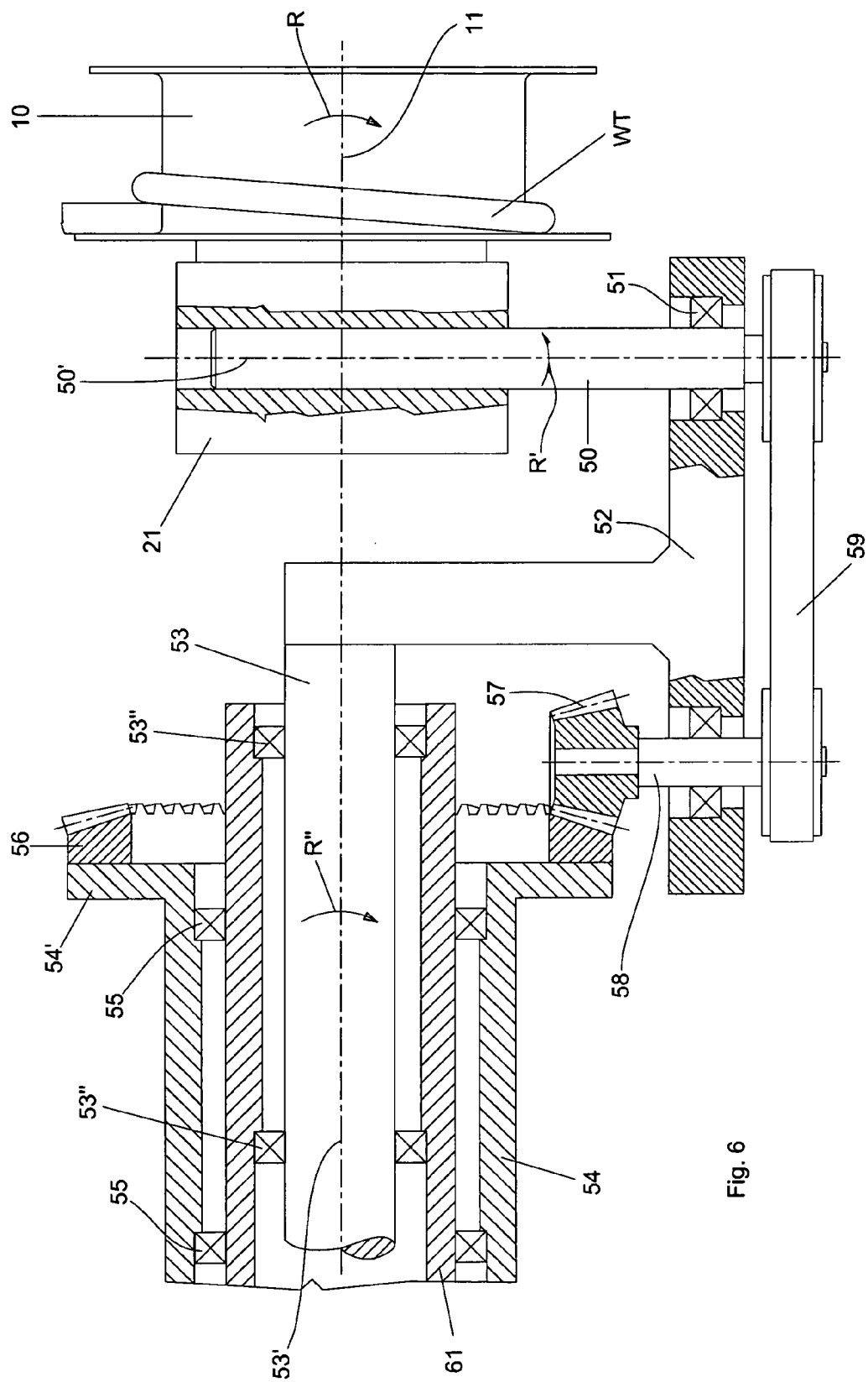
FIG. 6 is a partial sectional view from directions 6-6 of FIG. 7.
Figure 7:
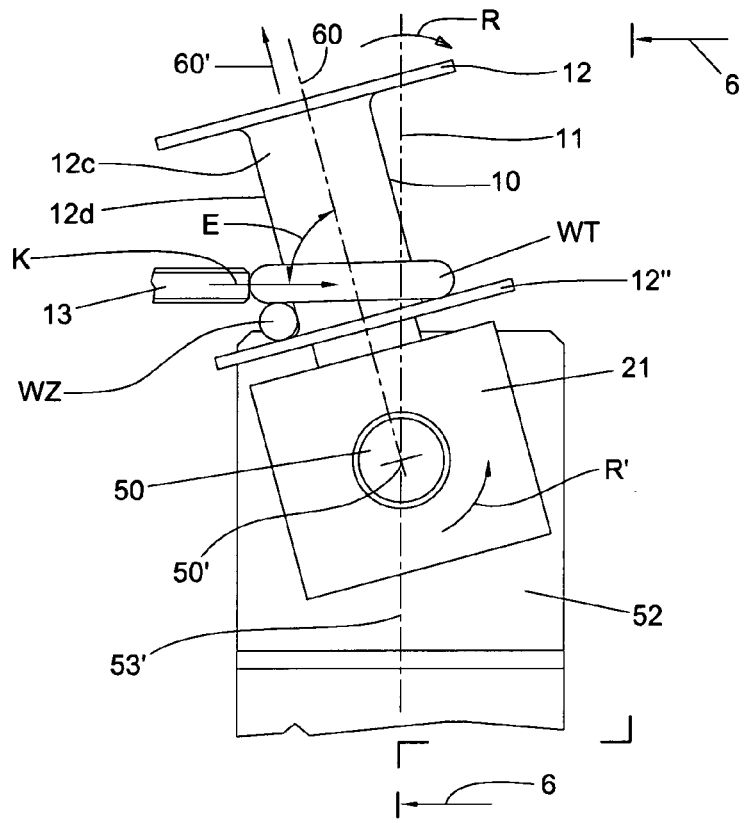
FIG. 7 is a view similar to FIG. 1 illustrating an embodiment of the invention.

With reference to FIGS. 6 and 7, a particular embodiment of the invention provides holding member 21 that is adapted to hold coil support 10, where the holding member is fixed to shaft 50 for rotation R' around axis 50'. Axis 50' can be perpendicular to rotation axis 11 that is required for rotation R accomplished during winding. Shaft 50 can be assembled on bearings 51 of support member 52. Support member 52 can be fixed to the end of shaft 53, which is assembled on bearings 53" of frame member 61. Axis 53' of shaft 53 can be in alignment with rotation axis 11, such that the rotation of shaft 53 on bearings 53" accomplishes the rotation R of coil support 10 around axis 11 (see also FIG. 7) that is necessary for winding.

Hollow member 54 can be assembled on bearings 55 of frame member 61 to be coaxial to shaft 53, as shown in FIG. 6. Consequently, hollow member 54 can accomplish rotation R" around axis 53'. End portion 54' of hollow member 54 can carry a crown gear 56, as shown in FIG. 6. Crown gear 56 can engage a pinion gear 57 that is assembled on a shaft 58. Shaft 58 is supported for rotation on support member 52, as shown in FIG. 6. A belt transmission 59 transmits rotation of shaft 58 to shaft 50.

In this way, rotation R" around axis 53' of hollow member 54 is transmitted to shaft 50 for achieving rotation R' of holding member 21 around axis 50', and therefore rotation R' of coil support 10 around axis 50'. The drive means for rotating hollow member 54 and shaft 53 has not been shown for reasons of clarity.

FIG. 7 shows a rotation R' of holding member 21 around axis 50' due to a rotation R" around axis 53' of hollow member 54. This rotation R' has an inclined axis of symmetry 60 of coil support 10 with respect to axis of rotation 11 and to axis 53'. The resulting position of coil support 10 due to rotation R' can be used to incline wire W, for example on a transverse or shorter side like 12C of coil support 10, in order to form a transition portion WT of wire W going from a complete turn to another in a direction like 60' (i.e. parallel to axis 60), as shown in FIG. 7.

During the winding rotation R and with the inclination of the coil support as shown in FIG. 7, wheel 13 moves to maintain the deformation pressure on transition portion WT.

The deformation pressure is applied on the wire portions of transition portion WT, which are immediately adjacent to the wire that still has to be wound on the coil support. In this way, the wire that forms transition portion WT can be permanently deformed and positioned against the coil support.

At the same time, dispensing member 19 can be moved during the rotation of the coil support and the inclination of the coils support as shown in FIG. 7, so as to maintain constant the orientation of wire extension WE.

In FIG. 7, transition portion WT has been completed and wheel 13 applies pressure on the wire that is wound along side 12d. A pressure is applied in direction K having an angle E with respect to axis 60 of coil support 10. Angle E is not perpendicular to axis 60 of the coil support. In particular angle E can be less than perpendicular and more than zero, as shown in FIG. 7, therefore the pressure exerted by wheel 13 has a component that presses on portion WZ of wire W, to maintain portion WZ in position against flange 12".

Figure 8:
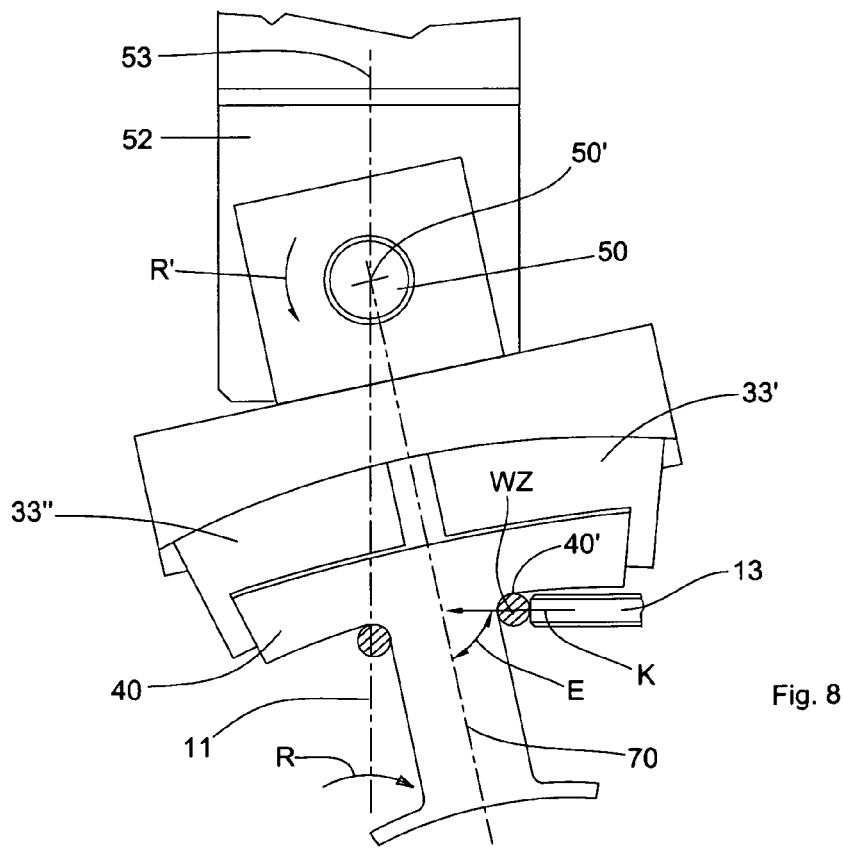
FIG. 8 is a view similar to FIG. 7 that illustrates winding a single pole according to a further embodiment of the invention.

FIG. 8 shows the single pole 40 that is being wound in a manner which is similar to the description of FIGS. 6 and 7. Rotation R' of chucks 33' and 33" around axis 50' has an inclined axis 70 of single pole 40 with respect to axis of rotation 11 and to axis 53'. This position of the single pole allows wheel 13 to be received very near to circumference portion 40' of single pole 40, where wheel 13 is able to press on an initial wire portion like WZ to press it against circumference portion 40' of single pole 40.

Figure 9:
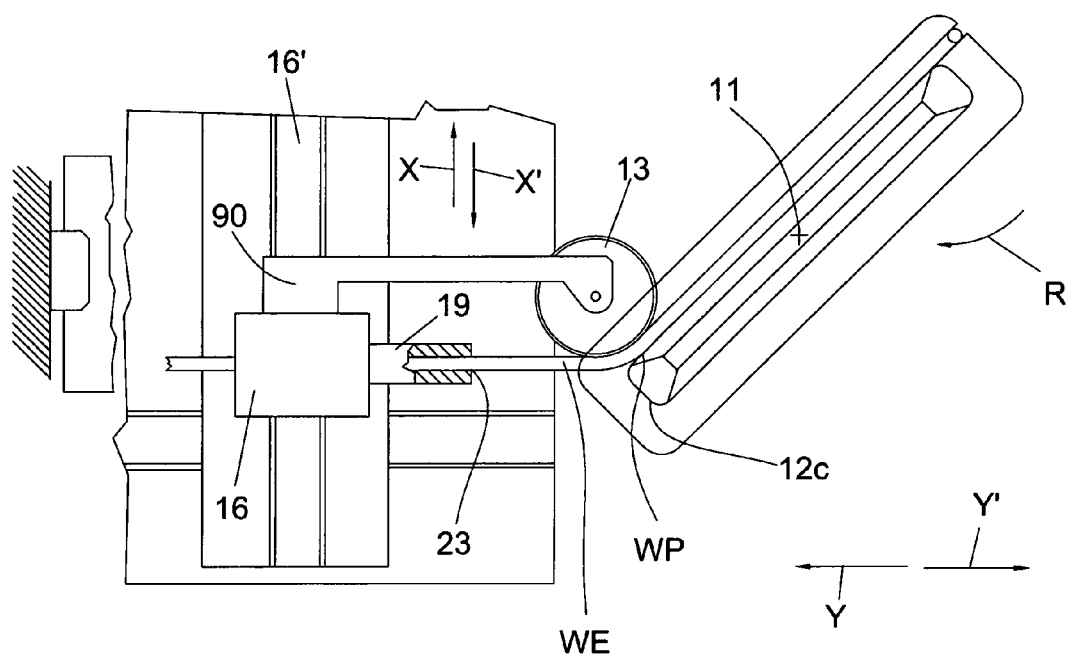
FIG. 9 is a view similar to the view of FIG. 2B illustrating a further embodiment of the invention performing a winding stage like that of FIG. 2B.

FIG. 9, which is a view similar to the view of FIG. 2B, illustrates a further embodiment of the invention where pressure wheel 13 and dispensing members 19 are both carried by platform 16. As shown in FIG. 9, pressure wheel 13 is positioned by means of arm 90 on platform 16 and dispensing member 19 is oriented on platform 16 so that pressure wheel 13 is pressing on a wire portion WP that is immediately adjacent to a portion of the wire that still has to be wound on the coil support. In the embodiment of FIG. 9, by means of the movements of platforms 16, 17 and 18 in direction X,X',Y,Y',Z,Z' it is possible to simultaneously move pressure wheel 13 and dispensing member 19 with common movements with respect to rotation axis 11, in order to guarantee a pressure contact on the wire that is being wound around the coil support. Arm 90 can be moveable on platform 16 to adjust the position of pressure wheel 13 with respect to dispensing member 19.

For the embodiments that have been described in the foregoing, an example of an alternative solution for the relative motion of dispensing member 19 with respect to coil support 10 or the single pole 40, for maintaining the angular orientation of extension WE constant during winding, can provide moving the coils support 10 or single pole 40 in direction Y e Y'. For example by translating in directions Y and Y' rotation axis 11, which at the same time will remain parallel to directions Z and Z'.

A similar situation occurs for the relative movement which changes the distance that separates pressure wheel 13 from rotation axis 11 of coil support during winding. In fact, coil support 10 or single pole 40 can move in directions X' and X, Y and Y', Z and Z', by translating in such directions the rotation axis 11.

The controls, the adjustments, the programming and the synchronizations described in the foregoing can be achieved using suitable means for automatic processing, logics and controls like those presently available to the skilled man.

The foregoing description of specific embodiments will so fully reveal the invention according to the conceptual point of view, so that others, by applying current knowledge, will be able to modify and/or adapt for various applications such an embodiment without further research and without departing from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. Apparatus for winding coils of at least one electric wire on a coil support that is wound and assembled on a pole of a core of a dynamo electric machine, or a pole that is wound and assembled to form the core of the dynamo electric machine, the apparatus comprising:
    a wire dispensing member for dispensing the wire, the wire dispensing member configured to translate relative to an axis of rotation of the coil support to change a distance between the dispensing member and the axis of rotation, the wire dispensing member having a passage portion for the wire and an exit from where the wire reaches the coil support during winding, wherein during winding the wire that extends from the dispensing member to the coil support has an angular orientation with respect to the exit that remains constant, and wherein during winding the wire that extends from the dispensing member to the coil support is not inclined with respect to the exit;
    an assembly for rotating the coil support with respect to the dispensing member for a rotation around the axis of rotation to wind the wire onto the coil support; and
    means for pressing on a wire portion wound on the coil support, wherein during winding the means for pressing presses on a portion of wire that is located on the coil support immediately adjacent to a portion of wire that still has to be wound on the coil support.

2. The apparatus of claim 1, wherein platforms are provided for relatively moving the means for pressing to change a distance that separates the means for pressing from the axis of rotation of the coil support during winding.

3. The apparatus of claim 2, wherein the platforms relatively move the means for pressing as a function of an angular position of the coil support during the rotation.

4. The apparatus of claim 1, wherein the means for pressing is relatively moved with respect to the coil support along sides of the coil support with a motion that is parallel to the sides of the coil support for applying pressure on the wire.

5. The apparatus of claim 4, wherein a speed of relative movement of the means for pressing to remain in contact with wire being wound is a function of an angular position of the coil support during the rotation.

6. The apparatus of claim 1, wherein the means for pressing is relatively moved in a reciprocating manner in a first direction and in a second direction along a side of the coil support.

7. The apparatus of claim 1, wherein the means for pressing presses on the wire in a direction that is perpendicular to the axis of rotation.

8. The apparatus of claim 1, wherein rotation members for relatively rotating the coil support with respect to the means for pressing are provided to press the wire in a direction with an angle that is more than zero and is not perpendicular to an axis of the coil support.

9. The apparatus of claim 1, wherein rotation members for relatively rotating the coil support with respect to the means for pressing are provided, said rotation members comprising a hollow member, wherein the hollow member is positioned coaxial to a shaft that is required for rotation of the coil support during winding.

10. The apparatus of claim 9, wherein the rotation members rotate the coil support around an axis that is perpendicular to the axis of rotation.

11. The apparatus of claim 1, wherein a platform for relatively moving the dispensing member with respect to the coil support is provided to maintain the angular orientation constant during winding.

12. The apparatus of claim 11, wherein the platform changes a distance that separates the dispensing member from the axis of rotation of the coil support.

13. The apparatus of claim 1, wherein an engagement member for engaging a portion of wire wound on the coil support and that extends to the dispensing member is provided such that the portion of wire is engaged in a direction opposite to a direction of stratification.

14. The apparatus of claim 1, wherein a support for supporting the wire dispensing member and the means for pressing in predetermined position and orientation with respect to the coil support is provided and wherein platforms for moving the support to move the wire dispensing member and the means for pressing simultaneously and with common movements is also provided.

15. A method for winding coils of at least one electrical wire on a coil support that is wound and assembled on a pole of a core of a dynamo electric machine, or a pole that is wound and assembled to form the core of a dynamo electric machine, the method comprising the steps of:
dispensing the wire using a dispensing member configured to translate relative to an axis of rotation of the coil support to change a distance between the dispensing member and the axis of rotation, the wire dispensing member having a passage portion for the wire and an exit from where the wire reaches the coil support during winding of the coil, wherein during winding the wire that extends from the dispensing member to the coil support has an angular orientation with respect to the exit that remains constant, and wherein during winding the wire that extends from the dispensing member to the coil support is not inclined with respect to the exit;
rotating the coil support with respect to the dispensing member for rotation around the axis of rotation to wind the wire onto the coil support; and
pressing with pressing means on a portion of wire wound on the coil support, wherein the portion of wire on which a pressing occurs is located on the coil support that is immediately adjacent to a portion of wire that still has to be wound on the coil support.

16. The method of claim 15, further comprising changing a distance that during winding separates the means for pressing from the axis of rotation of the coil support.

17. The method of claim 15, further comprising relatively moving the pressing means as a function of an angular position of the coil support during the rotation.

18. The method of claim 15, further comprising relatively moving the pressing means along sides of the coil support with a motion parallel to the sides of the coil support in order to apply pressure on the wire.

19. The method of claim 18, further comprising relatively moving the pressing means with a speed that is a function of an angular position of the coil support during the rotation.

20. The method of claim 15, further comprising relatively moving the pressing means in a reciprocating manner in a first direction and in a second direction along a side of the coil support.

21. The method of claim 15, wherein the step of pressing on the wire occurs in a direction that is perpendicular to the axis of rotation.

22. The method of claim 15, further comprising pressing on the wire in a direction having an angle that is more than zero and is not perpendicular to an axis of the coil support.

23. The method of claim 15, further comprising relatively rotating an axis of the coil support along which the coil turn displacement occurs to become inclined at an angle that is more than zero and is not perpendicular to the axis of rotation.

24. The method of claim 23, further comprising displacing the coil turn when the coil support is relatively rotated to become inclined with respect to the axis of rotation.

25. The method of claim 23, wherein the coil support is relatively rotated around an axis that is perpendicular to the axis of rotation.

26. The method of 15, further comprising relatively moving the dispensing member with respect to the coil support to maintain the angular orientation constant during winding.

27. The method of claim 15, further comprising engaging the portion of wire that is wound on the coil support and that extends to the dispensing member, and wherein the step of engaging occurs in opposition to a direction of stratification.

28. The method of claim 15, further comprising
providing a support for supporting the wire dispensing member and the means for pressing in predetermined positions and orientations with respect to the coil support, and
moving the support to move the wire dispensing member and the means for pressing simultaneously and with common movements.

29. Apparatus for winding coils of at least one electric wire on a coil support that is wound and assembled on a pole of a core of a dynamo electric machine, or a pole that is wound and assembled to form the core of the dynamo electric machine, the apparatus comprising:
a wire dispensing member for dispensing the wire, the wire dispensing member configured to translate relative to an axis of rotation of the coil support to change a distance between the dispensing member and the axis of rotation, the wire dispensing member having a passage portion for the wire and an exit from where the wire reaches the coil support during winding, wherein during winding the wire that extends from the dispensing member to the coil support is not inclined with respect to the exit;

an assembly for rotating the coil support with respect to the dispensing member for a rotation around the axis of rotation to wind the wire onto the coil support; and means for pressing on a wire portion wound on the coil support, wherein during winding the means for pressing presses on a portion of wire that is located on the coil support immediately adjacent to a portion of wire that still has to be wound on the coil support.

30. A method for winding coils of at least one electrical wire on a coil support that is wound and assembled on a pole of a core of a dynamo electric machine, or a pole that is wound and assembled to form the core of a dynamo electric machine, the method comprising the steps of:

dispensing the wire using a dispensing member configured to translate relative to an axis of rotation of the coil support to change a distance between the dispensing member and the axis of rotation, the wire dispensing member having a passage portion for the wire and an exit from where the wire reaches the coil support during winding of the coil, wherein during winding the wire that extends from the dispensing member to the coil support is not inclined with respect to the exit;

rotating the coil support with respect to the dispensing member for rotation around the axis of rotation to wind the wire onto the coil support; and pressing with pressing means on a portion of wire wound on the coil support, wherein the portion of wire on which a pressing occurs is located on the coil support that is immediately adjacent to a portion of wire that still has to be wound on the coil support.

* * * * *